Feb. 21, 1928.　　　　　　　　　　　　　　　　　　　1,659,792
K. J. THORSBY
MACHINE FOR MAKING SPIRAL PIPE
Filed June 3, 1925　　　　　6 Sheets-Sheet 1

Fig. 1.

INVENTOR
Karl Johan Thorsby
BY
Booth & Booth
ATTORNEYS

Feb. 21, 1928.

K. J. THORSBY

1,659,792

MACHINE FOR MAKING SPIRAL PIPE

Filed June 3, 1925     6 Sheets-Sheet 3

INVENTOR
Karl Johan Thorsby
BY Booth & Booth
ATTORNEYS

Feb. 21, 1928. 1,659,792
K. J. THORSBY
MACHINE FOR MAKING SPIRAL PIPE
Filed June 3, 1925 6 Sheets-Sheet 5

INVENTOR
Karl Johan Thorsby
BY
Booth & Booth
ATTORNEYS

Patented Feb. 21, 1928.

1,659,792

UNITED STATES PATENT OFFICE.

KARL JOHAN THORSBY, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

MACHINE FOR MAKING SPIRAL PIPE.

Application filed June 3, 1925. Serial No. 34,568.

My invention relates to a machine for winding a strip or sheet of metal helically into tubular form, in the making of so-called spiral pipe.

The principal object of my invention is to provide an automatic and continuously operating machine for the described purpose, which is capable of accurately bending or winding the metal sheet, helically, into tubular form, the two edges of the wound sheet being smoothly contiguous throughout the entire length of the helical joint or seam formed between them, so that said edges may subsequently be united, by any desired process or means, to make a rigid and continuous pipe of uniform diameter having smooth and even walls.

A further object of the invention is to provide a machine which is readily adjustable to form various sizes of pipe from sheets of various width. Another object is to provide a machine of sufficiently rugged construction to enable it to operate successfully upon comparatively heavy metal. In actual practise, a machine constructed in accordance with the disclosures of the following specification, is capable of operating upon cold sheet steel of a thickness as great as three-eighths of an inch, and by merely increasing the size and strength of the various parts, still heavier metal could be handled successfully. A still further object is to reduce the friction involved in bending the sheet to a minimum.

Other objects and advantages of the invention will become apparent from the following specification, which should be read with the understanding that the form, construction, proportion, and arrangement of the several parts may be varied, within the limits of the claims hereto appended, without departing from the essential principles of the invention as set forth in said claims.

With this in view, a preferred embodiment of my invention will now be fully described with reference to the accompanying drawings, wherein—

Figure 1:
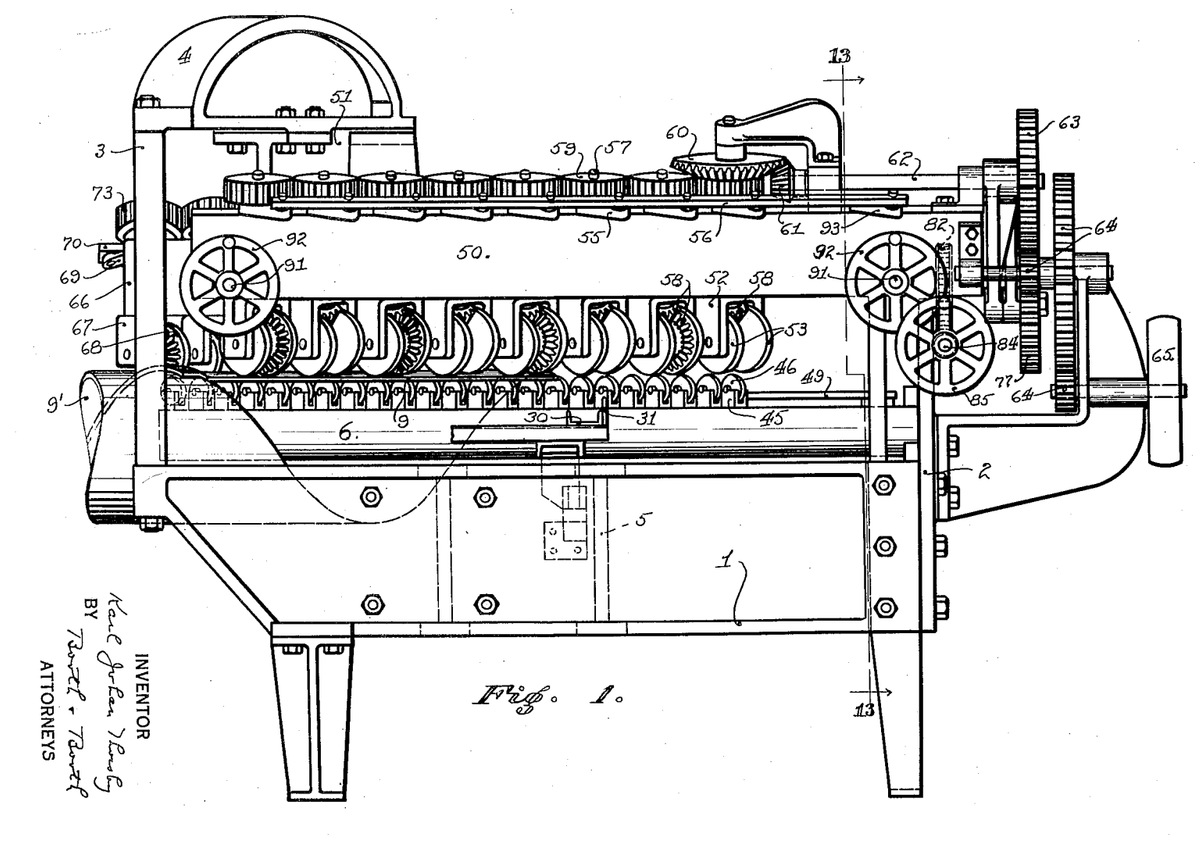
Fig. 1 is a front elevation of the machine, the feed table being omitted.
Figure 2:
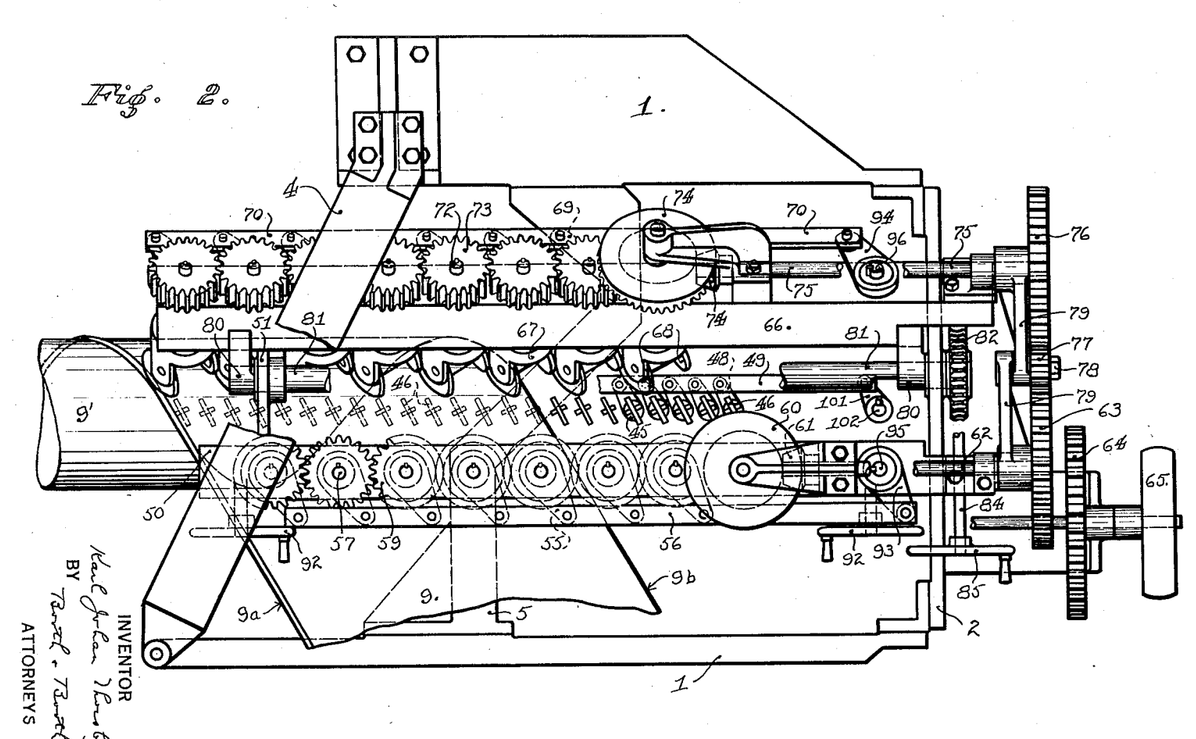
Fig. 2 is a partly broken plan view of the same.
Figures 3, 4, 5, 6:
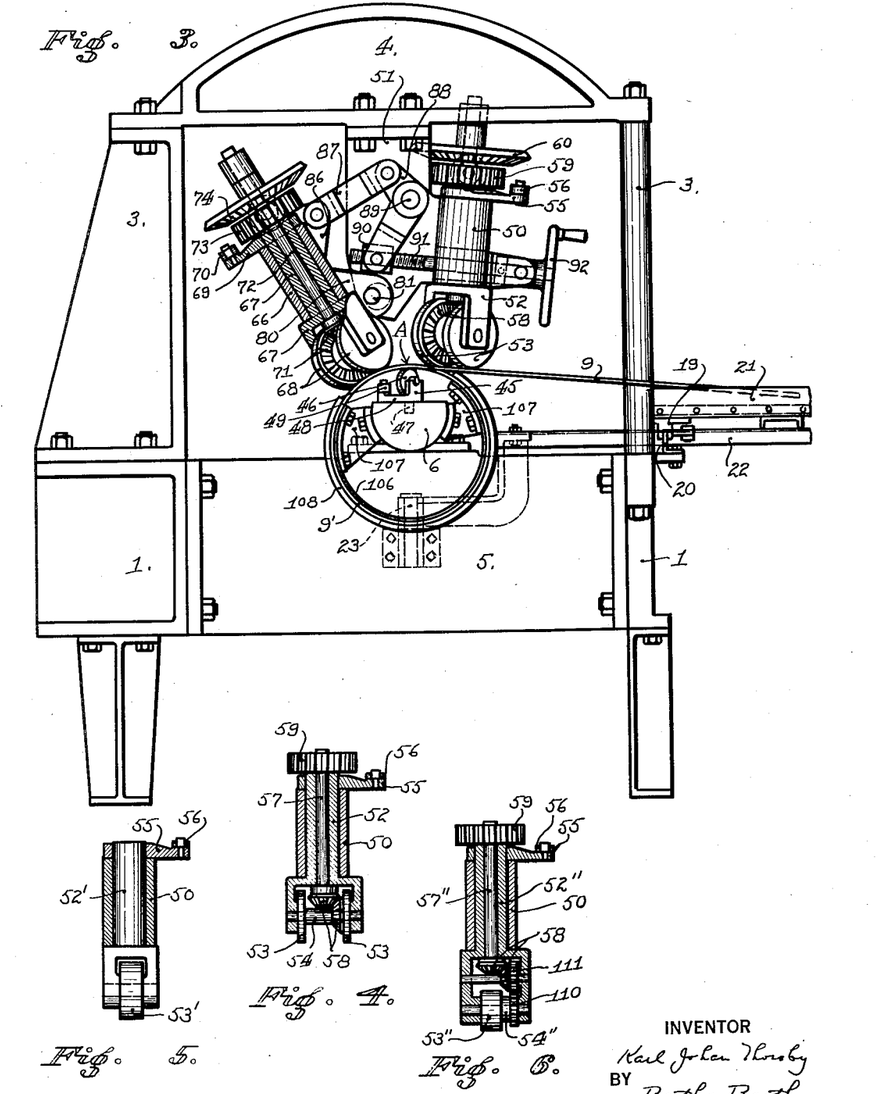
Fig. 3 is an end elevation as viewed from the left of Figs. 1 and 2.
Fig. 4 is a sectional detail of a preferred form of bending roll.
Fig. 5 is a sectional detail of a modified form of bending roll.
Fig. 6 is a sectional detail of another modified form of bending roll.
Figure 7:
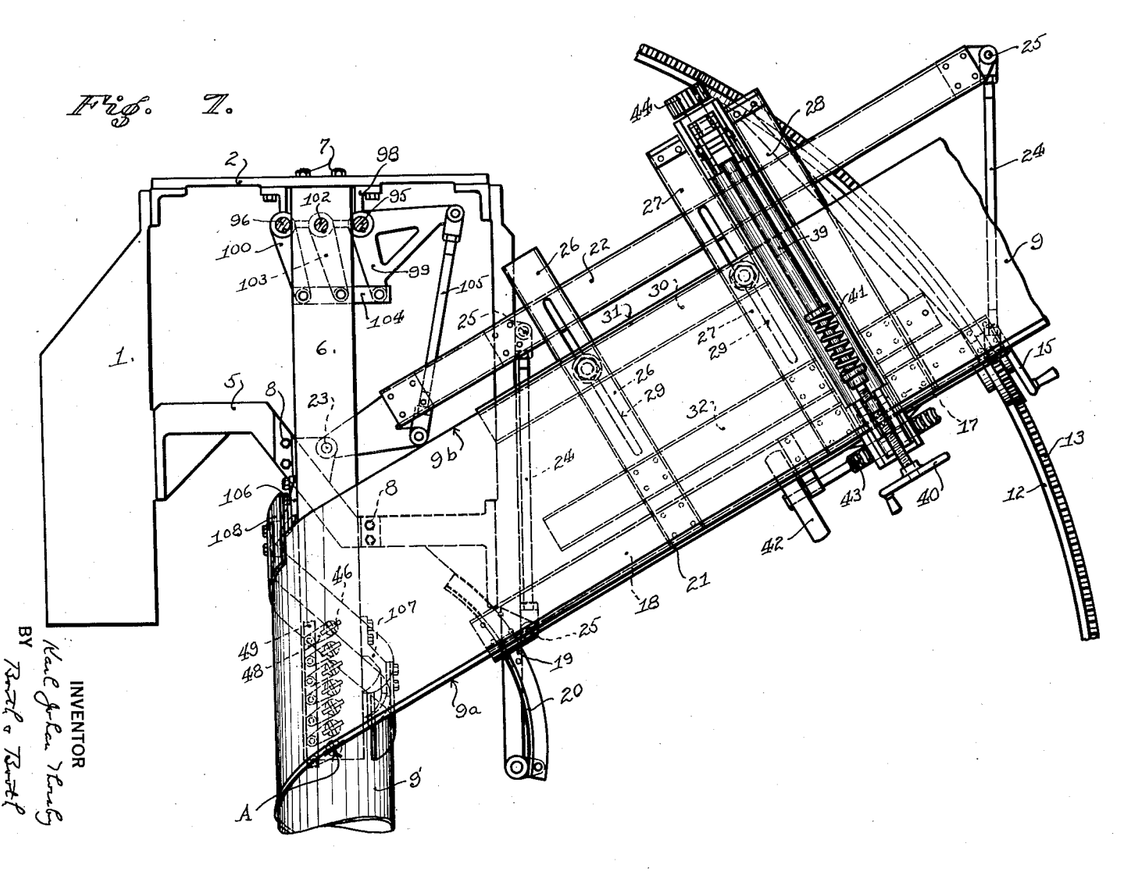
Fig. 7 is a plan view of the bed of the machine and the feed table, the bending means being omitted for the sake of clearness.

In the drawings, the reference numeral 1 designates a bed, from which rises an end plate 2 at one end, and a pair of spaced columns 3 at its other end. A bridge 4 connects the upper end of said columns, and a cross member 5 is mounted in the bed 1 about midway of its length. These parts are best shown in Figs. 1, 2, 3 and 7. A fixed horizontally disposed horn or stake 6, Fig. 7, is secured at one end to the end plate 2, as indicated at 7, and rests upon and is secured to the cross member 5 at 8. The stake 6 is thus secured to the bed or frame of the machine at its right hand portion, as viewed in Figs. 1 and 2, its left hand portion being free. The pipe is formed around this stake 6, the sheet of metal 9 being fed thereto and wrapped or wound helically thereabout, as shown in Figs. 1, 2 and 3, by mechanism to be later described, and the formed pipe 9' discharging endwise off the free end of said stake.

Figures 8, 9, 10, 11:
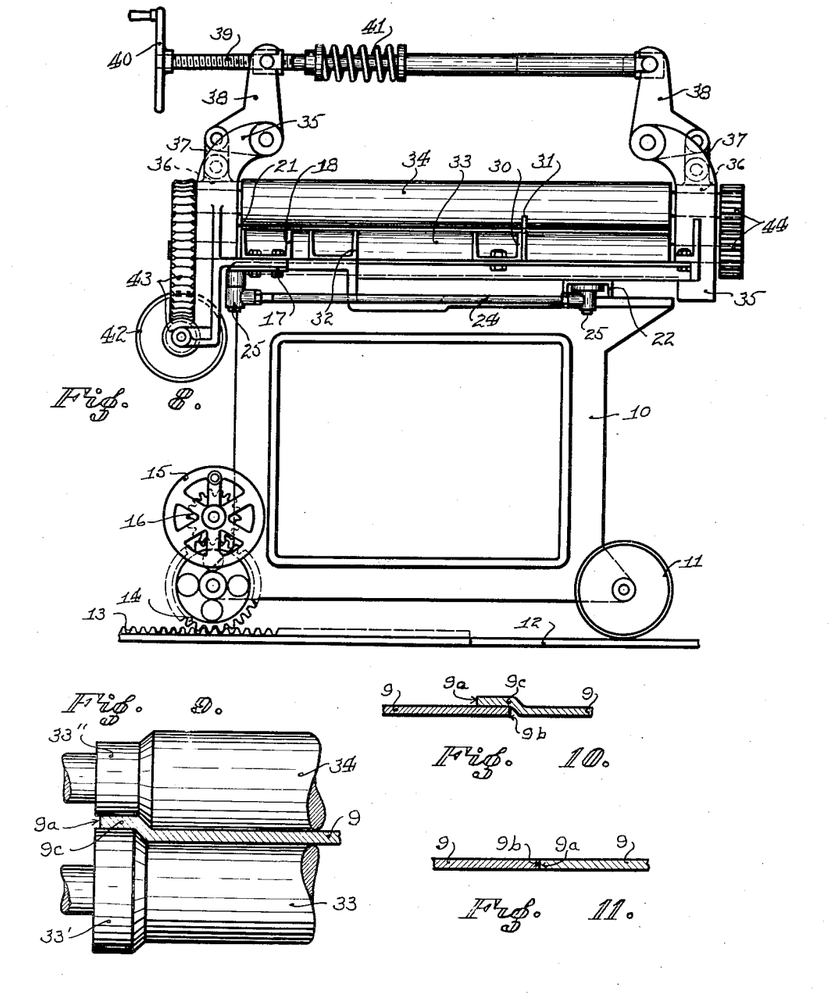
Fig. 8 is a front elevation of the feed table.
Fig. 9 is a sectional detail showing portions of a pair of feed rolls of modified form.
Figs. 10, 11, and 12 are sectional details showing different forms which may be given to the contiguous edges of the sheet to make the helical seam.

The sheet 9 is fed into the machine over a feed table illustrated in Figs. 7 and 8, said feed table being angularly adjustable with respect to the bed 1 to vary the angle of feed of the sheet, so that sheets of different width, and pipes of different diameter, may be formed. The feed table is supported at its outer end by a base 10 which is provided with wheels 11 adapted to travel upon an arcuate track 12, and which is further provided with means for moving it upon said track, comprising, for example, a rack 13 associated with said track, a gear 14 adapted to engage said rack, and a hand wheel 15 with a pinion 16 for operating said gear.

One side of the base 10 is rigidly connected, as at 17 in Fig. 7, with a horizontal member 18, whose inner end is provided with a grooved follower 19, Figs. 3 and 7, adapted to rest and slide upon an arcuate rail 20 secured to the bed 1 of the machine. The horizontal member 18 is provided with an upstanding flange 21, which acts as a guide for the edge $9^a$ of the sheet 9. Both the arcuate rail 20 and the arcuate track 12 are centered at a point A which lies at the intersection of the edge $9^a$ of the sheet with the center line of the stake 6, so that, no matter what the angle of feed may be, as determined by the angular position of the feed table with respect to the stake 6, the edge $9^a$ of the sheet will always pass through said point A.

A second horizontal member 22, Figs. 3 and 7, has its inner end pivotally connected at 23 with the cross member 5 of the bed 1, and has its outer end resting freely upon the feed table base 10. This member 22 is maintained in parallel relation to the horizontal member 18 by means of a pair of spaced parallel connecting links 24, Fig. 7, having their ends pivotally connected with said members 18 and 22, as shown at 25.

Cross members 26, 27 and 28 are secured at one end to the horizontal member 18, and freely rest upon the horizontal member 22, the latter being positioned somewhat below the level of the member 18, as shown in Fig. 8, so that said cross members are horizontal. The cross members 26 and 27 are provided with slots 29, Fig. 7, and carry a laterally adjustable member 30, which is positioned parallel to the member 18 and is provided with an upstanding flange 31 forming a guide for the edge $9^b$ of the sheet 9. The lateral position of the member 30 will, of course, be adjusted to the width of said sheet. As a further means for supporting the sheet 9 and strengthening the feed table structure, I may provide a member 32 rigidly connected with the cross members 26 and 27.

A pair of horizontally disposed feed rolls 33 and 34, Fig. 8, are mounted transversely upon the feed table between the cross members 27 and 28, as shown in Fig. 7. These rolls are carried in brackets 35, Fig. 8, secured to said cross members, the lower roll 33 being journaled directly in said brackets, and the upper roll 34 being journaled in suitably formed trunnions indicated at 36 and mounted for vertical movement in said brackets. In order to adjust the spacing of the rolls 33 and 34, said trunnions are connected by links 37 with bell-cranks 38, which are connected together by a screw 39 provided with a hand wheel 40, so that by turning said hand wheel the upper roll 34 is moved toward or away from the lower roll 33. A cushioning spring 41 is inserted in the screw 39 to secure constant pressure on the sheet and to absorb any irregularities in its thickness. The sheet 9 is passed between the rolls 33 and 34, as shown in Fig. 7, and is fed by them to the bending mechanism to be presently described. Any suitable means may be provided for driving the rolls 33 and 34, as for example a belt pulley 42, Figs. 7 and 8, connected by worm gearing 43 with the lower roll 33, and spur gears 44 connecting said lower roll with the upper roll 34.

Figure 12:
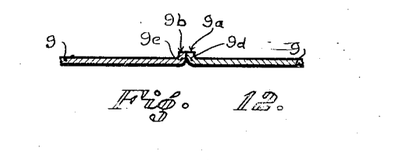

The feed rolls 33 and 34, instead of being straight as shown in Fig. 8, may be used for flanging one or both edges of the sheet 9. As an illustration of any desired form of flange, I have shown, in Fig. 9, said feed rolls provided at one end with cooperating portions 33' and 33'', adapted to form an offset flange $9^c$ at the edge $9^a$ of the sheet 9. In this case the helical seam or joint between the edges $9^a$ and $9^b$ of the sheet when wound into a pipe will assume the form shown in Fig. 10, the edge $9^a$ overlying the flat edge $9^b$, instead of lying flush with and adjacent thereto as shown in Fig. 11. Other forms of flanges may be formed in like manner, as, for example, the right-angle flanges $9^d$ and $9^e$ formed upon the respective edges $9^a$ and $9^b$ of the sheet, as shown in Fig. 12.

The sheet 9, advancing over the feed table members 18 and 30, and guided by the flanges 21 and 31, Fig. 7, is bent and wrapped helically about the free end portion of the stake 6 by mechanism which will now be described. The stake 6 has a flat top, upon which are mounted a series of trunnions 45, Figs. 1, 2 and 3, each carrying a roller 46. The trunnions 45 are mounted for horizontal swinging movement, as by means of pins, one of which is shown at 47, in Fig. 3, inserted into sockets in said stake, and are provided with laterally extending arms 48, all said arms being connected with a longitudinally disposed bar 49, Fig. 2. The rollers 46 may thus be adjusted, by means of said bar 49, so that their axes are at right angles to the direction of feed of the sheet 9.

Above the stake 6 and somewhat forward therefrom, is a fixed longitudinally disposed beam 50, Figs. 1, 2 and 3, supported at one end by the frame end member 2 and at the other end by a fixed bracket 51 depending from the bridge 4. A series of hollow spindles 52, one of which is shown in section in Fig. 4, are journaled in said beam 50, and said spindles have forked lower ends, which carry rollers 53. In the preferred form, as shown in Fig. 4, there are two such rollers mounted in each spindle, said rollers being fixed upon a common shaft or hub 54. The axes of the spindles 52 are preferably set at a slight inclination to the vertical, as shown in Fig. 3, and the rollers 53 are adapted to bear upon the upper surface of the sheet 9, said sheet passing between them and the stake rollers 46, as shown. The spindles 52 are provided at their upper ends with arms 55, all of which are connected with a longitudinally disposed bar 56, so that, by the movement of said bar, the axes of the rollers 53 may be adjusted to lie at right angles to the direction of feed of the sheet 9.

The rollers 53 are preferably positively driven, to assist in feeding the sheet 9 forwardly. For this purpose there is provided a shaft 57, Fig. 4, extending rotatably through each spindle 52, and connected by bevel gears 58 with the roller hub 54. The upper ends of said shafts 57 are provided with inter-meshing gears 59, forming a continuous train along the top of the beam 50, as shown in Figs. 1 and 2, and the endmost shaft carries also a bevel gear 60, which is driven by a pinion 61 upon a short horizontal shaft 62. The latter shaft has a gear 63 which is driven through a train of speed reducing gearing 64 from a belt pulley 65, as shown in Figs. 1, 2 and 14.

A second beam 66, Figs. 2 and 3, is mounted to the rear of the beam 50, and carries a series of spindles 67, similar in construction and mounting to the spindles 52 described above. Each spindle 67 carries in its lower end a pair of connected rollers 68 adapted to bear against the upper surface of the sheet 9, and said spindles are preferably inclined, as shown in Fig. 3. Arms 69, Figs. 2 and 3, secured to the upper ends of the spindles 67, are connected with a longitudinally disposed bar 70, by means of which the axes of the rollers 68 may be adjusted to a position at right angles to the direction of feed of the sheet.

Figures 14, 15:
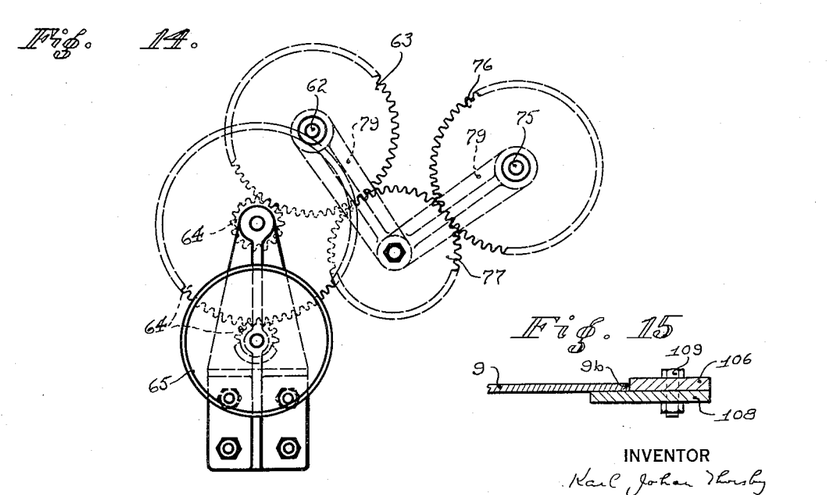
Fig. 14 is an end elevation of the driving gears as viewed from the right of Figs. 1 and 2.
Fig. 15 is a sectional detail of the helical guide member shown in Figs. 3 and 7.

The rollers 68 are preferably positively driven, to assist in feeding the sheet, by mechanism similar to that employed for driving the rollers 53 and consisting of bevel gears 71, Fig. 3, shafts 72 extending rotatably through the spindles 67, a train of gears 73 fixed upon said shafts, bevel gears 74, Fig. 2, connecting the endmost spindle shaft with a short horizontal shaft 75, and a gear 76, Figs. 2 and 14, mounted upon said shaft 75 and connected with the gear 63 by an idler 77. This idler is journaled upon a stud 78 carried by a pair of toggle links 79 whose outer ends are pivotally mounted about the shafts 62 and 75, so that the position of the latter shaft may be varied without affecting its driving connections.

Figure 13:
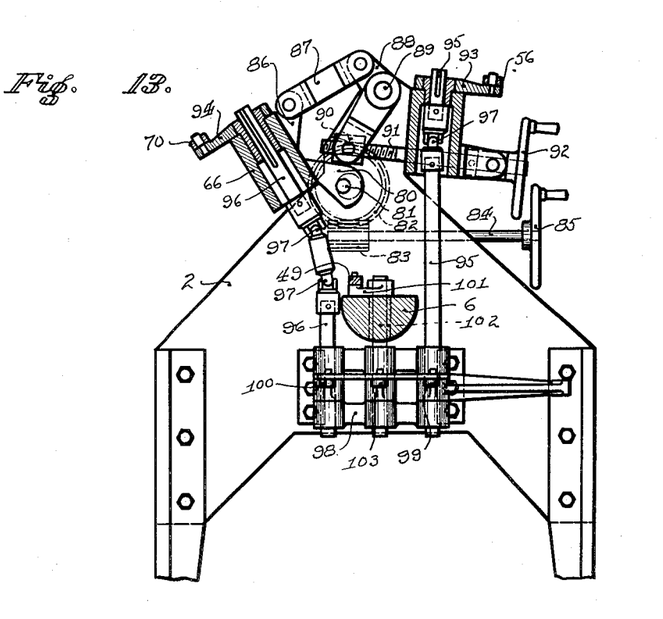
Fig. 13 is a transverse section taken approximately on the line 13—13 of Fig. 1 and viewed in the direction of the arrows.

The bending of the sheet 9 occurs along the line of its contact with the stake rollers 46, as is shown in Fig. 3, this line extending through the point A mentioned above. In order to provide for the formation of pipes of different diameters, the rollers 68 are adjustable toward or away from the stake rollers 46, such adjustment causing more or less bending of the sheet. For this purpose the beam 66, carrying the rollers 68, is eccentrically mounted by means of ears 80, Figs. 2, 3 and 13, upon a longitudinal shaft 81, and said shaft carries at one end a worm wheel 82, Figs. 2 and 13, adapted to be turned by a worm 83 carried upon a transverse shaft 84 which is provided with a hand wheel 85. The upper portion of the beam 66 is provided at either end with ears 86, one of which is shown in Figs. 3 and 13, and which are connected by links 87 with bell-cranks 88. The latter are fulcrumed at 89 and carry nuts 90 threaded upon screw shafts 91 provided with hand wheels 92. Thus by means of the hand wheels 92, the beam 66 may be rocked about its eccentric pivot shaft 81, and by means of the hand wheel 85 its fulcrum point may be shifted. This double adjustment of said beam is necessary to insure the proper bearing of both rollers 68 of each pair upon the sheet 9, on account of the angular relation or inclination of the axes of said rollers to the axis of the cylinder or pipe 9' formed from said sheet.

The horizontal angularity or inclination of the axes of all three sets of rollers 46, 53 and 68 is automatically changed by any change in the angular position of the feed table, so that the axes of said rollers are always at right angles to the direction of feed of the sheet 9. For this purpose the spindle adjusting bars 56 and 70, Figs. 2 and 13, are connected at their right hand ends with arms 93 and 94, respectively secured upon downwardly extending shafts 95 and 96. These shafts extend through the beams 50 and 66, respectively, and are provided with suitable universal joints 97, Fig. 13. Their lower ends are journaled in a bracket 98 secured to the end frame member 2, and are respectively provided with arms 99 and 100.

Similarly, the stake roller adjusting bar 49 is connected by an arm 101 with a vertical shaft 102, Figs. 2 and 13, which is also journaled in the bracket 98 and provided with an arm 103. The arms 99, 100 and 103 are inter-connected by a link 104, Fig. 7, and are connected by a link 105 with the feed table member 22. Thus any angular adjustment of the feed table automatically swings the axes of all three sets of rollers so that said rollers track perfectly, without side slip, upon the sheet 9.

On account of this positioning of the bending rollers, the sheet 9 is fed and bent, accurately and at the proper angle, so that its edge 9b, after making one complete revolution about the stake 6, meets the edge 9a in the desired relation at the point A, and said edges remain contiguous thereafter, forming a true helical seam, and may be joined together, by any suitable means not indicated in the drawings, to form a rigid pipe. However, as a further means of insuring accuracy, I may provide a helical guide as shown in Figs. 3 and 7, comprising a rigid strip 106 disposed helically part way around the stake 6 and secured thereto by brackets 107. This strip is adapted to bear against and guide the edge 9b of the sheet, as shown in Figs. 7 and 15. A flange 108, which may either be integral with the strip 106 or secured thereto by bolts 109, is positioned to overlie the edge portion of the sheet, to prevent bulging thereof. Obviously, when the machine is adjusted to different sizes of pipe or sheets of different width, the guide members 106 and 108 must be removed and replaced with others of proper form.

As stated above, the machine will operate successfully without the guide members 106 and 108, the sheet being bent to true cylindrical form, with its edges lying close together to make the helical seam, by the action of the feed rolls 33 and 34 and the angularly disposed bending rollers 53 and 68. However, by employing said helical guide members, I am able, in certain cases to dispense with the positive drive mechanism for the bending rollers 53 and 68, relying solely upon the feed rolls 33 and 34 to force the sheet through. The bending rollers may then be constructed as shown in Fig. 5, the spindle 52' carrying a single roller 53' in its forked lower end, said roller being adapted to bear upon the sheet 9, but having no driving means. This form of spindle and roller may be mounted in either or both beams 50 and 66, resulting in the partial or whole elimination of the roller driving mechanism previously described, without further changes in the machine.

A modification of the positively driven bending roller construction is shown in Fig. 6. In this form the forked end of the spindle 52" is slightly longer than that of the spindle 52 of Fig. 4 and carries a single roller 53" secured upon a hub 54", said hub being driven by a pair of spur gears 110 and 111 and the bevel gears 58" from the spindle shaft 57". When this form of roller is used in the adjustable beam 66, the adjustment of said beam is rendered simpler. On account of the use of the single roller 53" in each spindle, instead of the double spaced rollers 53, the effective line of contact with the sheet is shorter, and to that extent is less affected by the rotative adjustment of the spindles. The adjustment of the beam 66 may therefore be made entirely with the hand wheel 92, Fig. 3, the adjustable eccentric fulcrum 81 of said beam being replaced by a simple pivot.

The positioning of the three sets of bending rollers 46, 53 and 68 with their axes at right angles to the direction of feed of the sheet 9, so that there is no side slip of said sheet upon said rollers, not only enables the machine to wind the sheet into tubular form with its contiguous edges making an accurate and smooth helical seam, and capable of being subsequently joined together, readily and successfully, to form a rigid pipe, but also reduces the friction involved in the bending or winding operation to a minimum, there being no point at which the advancing sheet slides upon a stationary surface under any considerable pressure. Even if the helical guide members 106 and 108 be employed, both the pressure of the edge of the sheet against them, and the area of its contact therewith, are relatively small.

I claim:—

1. In a machine for making spiral pipe, a fixed stake; a series of rollers mounted thereupon, the axes of said rollers being inclined with respect to the axis of said stake; and means for feeding a sheet of metal over said rollers and winding the same helically into tubular form about said stake.

2. In a machine for making spiral pipe, a fixed stake; a series of rollers mounted thereupon; means for feeding a sheet of metal over said rollers and winding the same helically into tubular form about said stake; and means for angularly adjusting said rollers to position their axes substantially at right angles to the direction of feed of the sheet.

3. In a machine for feeding and bending a sheet of metal helically into tubular form, a series of rollers adapted to bear against the inner surface of said sheet along the line of bending thereof, the axes of said rollers being positioned substantially at right angles to the direction of feed of said sheet.

4. In a machine for feeding and bending a sheet of metal helically into tubular form, a series of rollers adapted to bear against the inner surface of said sheet along the line of bending thereof; and means for angularly adjusting said rollers to position their axes substantially at right angles to the direction of feed of said sheet.

5. In a machine for making spiral pipe, a plurality of sets of rollers adapted to bend a sheet of metal helically into tubular form, the axes of said rollers being positioned substantially at right angles to the direction of feed of the sheet; and means for rotating the rollers of one set to feed the sheet.

6. In a machine for making spiral pipe, a fixed stake; a roller carried thereby; a beam positioned parallel to said stake; rollers carried by said beam; means for feeding a sheet of metal between said rollers to cause it to be wound helically into tubular form; and means for adjusting the position of said beam to vary the diameter of the formed tube.

7. In a machine for making spiral pipe, a fixed stake; a roller carried thereby; a beam positioned parallel to said stake; rollers carried by said beam; means for feeding a sheet of metal between said rollers to cause it to be wound helically into tubular form; and means for positioning the axes of said beam rollers substantially at right angles to the direction of feed of the sheet.

8. In a machine for making spiral pipe, a fixed stake; a roller carried thereby; a beam positioned parallel to said stake; rollers carried by said beam; means for feeding a sheet of metal between said rollers to cause it to be wound helically into tubular form; and means for rotating said beam rollers to assist the feeding of said sheet.

9. In a machine for making spiral pipe, a fixed stake; a roller carried thereby; a beam positioned parallel to said stake; a spindle adjustably mounted in said beam; a roller carried by said spindle; means for feeding a sheet of metal between said rollers to cause it to be wound helically into tubular form; and means for adjusting said spindle to position the axis of its roller substantially at right angles to the direction of feed of said sheet.

10. In a machine for making spiral pipe, a fixed stake; a roller carried thereby; a beam positioned parallel to said stake; a spindle adjustably mounted in said beam; a roller carried by said spindle; means for feeding a sheet of metal between said rollers to cause it to be wound helically into tubular form; and means for rotating said beam roller to assist the feeding of said sheet, such means comprising a rotatable shaft extending through said spindle and connected with said roller, and a driving connection associated with said shaft.

11. In a machine for making spiral pipe, a fixed stake; a roller carried thereby; a beam positioned parallel to said stake; a series of rollers carried by said beam; means for feeding a sheet of metal between said rollers to cause it to be wound helically into tubular form; a rotatable shaft connected with each beam roller and extending through said beam; intermeshing gears secured to said shafts; and means for driving one of said gears to cause the rotation of said rollers.

12. In a machine for making spiral pipe, a fixed stake; a roller carried thereby; a pair of beams positioned parallel with said stake; rollers carried by said beams; means for feeding a sheet of metal between the rollers of said stake and said beams to cause it to be wound helically into tubular form about said stake; and means for adjusting the position of one of said beams to vary the diameter of the formed tube.

13. In a machine for making spiral pipe, a plurality of sets of rollers adapted to wind a sheet of metal helically into tubular form; means for positioning the axes of said rollers substantially at right angles to the direction of feed of the sheet; and means for moving one set of rollers toward or away from the others to vary the diameter of the formed tube.

14. In a machine for making spiral pipe, a plurality of parallel members; a series of rollers carried by each member and adapted to wind a sheet of metal helically into tubular form; and means for simultaneously positioning the axes of said rollers substantially at right angles to the direction of feed of the sheet.

15. In a machine for making spiral pipe, a plurality of parallel members; a series of rollers carried by each member and adapted to wind a sheet of metal helically into tubular form; and means for moving one of said members toward or away from the others to vary the diameter of the formed tube.

16. In a machine for making spiral pipe, a plurality of rollers for winding a sheet of metal helically into tubular form; means for guiding said sheet in its travel toward said rollers; means for varying the angular relation between said guiding means and the axis of the formed tube; and means for adjusting said rollers to position their axes substantially at right angles to the direction of travel of the sheet.

17. In a machine for making spiral pipe, a plurality of rollers for winding a sheet of metal helically into tubular form; means for guiding said sheet in its travel toward said rollers; and means for simultaneously varying the angular positions of said guiding means and the axes of said rollers with relation to the axis of the formed tube.

18. In a machine for making spiral pipe, a plurality of rollers for winding a sheet of metal helically into tubular form; means for guiding said sheet in its travel toward said rollers; means for varying the angular relation between said guiding means and the axis of the formed tube; and a connection between said guiding means and said rollers whereby the latter are angularly adjusted to correspond with the position of said guiding means.

19. In a machine for making spiral pipe, a plurality of rollers for winding a sheet of metal helically into tubular form; a feed table for supporting said sheet; adjustably spaced means carried by said table for guiding said sheet by engagement with its edges; and means for angularly adjusting said guiding means about the point, as a center, at which the opposite edges of the wound sheet first meet.

20. In a machine for making spiral pipe, a plurality of rollers for winding a sheet of metal helically into tubular form; a feed table for supporting and guiding said sheet; and means for angularly adjusting said feed table about the point, as a center, at which the opposite edges of the wound sheet first meet.

21. In a machine for making spiral pipe, a plurality of rollers for winding a sheet of metal helically into tubular form; a feed table for supporting and guiding said sheet; means carried by said feed table for feeding the sheet toward said rollers; and means for angularly adjusting said feed table about the point, as a center, at which the opposite edges of the wound sheet first meet.

22. In a machine for making spiral pipe, a plurality of rollers for winding a sheet of metal helically into tubular form; means for guiding said sheet laterally in its path between said rollers; and means for varying the angular relation between said guiding means and the axis of the formed tube about the point, as a center, at which the opposite edges of the sheet first meet.

23. In a machine for making spiral pipe, a plurality of rollers for winding a sheet of metal helically into tubular form; a feed table for supporting and guiding said sheet; and means for varying the angular relation between said feed table and the axis of the formed tube about the point, as a center, at which the opposite edges of the wound sheet first meet.

24. In a machine for making spiral pipe, a plurality of rollers for bending and winding a sheet of metal helically into tubular form, one of said rollers having a diameter materially less than that of the formed tube and bearing against the inner surface thereof, and the rest of said rollers bearing against the outer surface of the tube; and means for adjusting one of said rollers to incline its axis with respect to the axis of the formed tube.

25. In a machine for making spiral pipe, a plurality of rollers for bending and winding a sheet of metal helically into tubular form, one of said rollers having a diameter materially less than that of the formed tube and bearing against the inner surface thereof, and the rest of said rollers bearing against the outer surface of the tube, and one of said rollers being positioned with its axis inclined with respect to the axis of the formed tube.

26. In a machine for making spiral pipe, a plurality of sets of rollers for bending and winding a sheet of metal helically into tubular form, the rollers of one set being of materially smaller diameter than that of the formed tube and bearing against the inner surface thereof, and the rollers of the other sets bearing against the outer surface of the tube; and means for adjusting some of said rollers to incline their axes with respect to the axis of the formed tube.

27. In a machine for making spiral pipe, a plurality of sets of rollers for bending and winding a sheet of metal helically into tubular form, the rollers of one set being of materially smaller diameter than that of the formed tube and bearing against the inner surface thereof; and the remaining rollers bearing against the outer surface of the tube, and some of said rollers being positioned with their axes inclined with respect to the axis of the formed tube.

28. In a machine for making spiral pipe, a plurality of rollers for bending and winding a sheet of metal helically into tubular form, one of said rollers having a diameter materially less than that of the formed tube and bearing against the inner surface thereof, and the rest of said rollers bearing against the outer surface of the tube, and one of said rollers having its axis inclined with respect to the axis of the formed tube; and means for rotating one of said rollers to feed the sheet.

In testimony whereof I have signed my name to this specification.

KARL JOHAN THORSBY.